United States Patent
Iino

(10) Patent No.: US 8,102,166 B2
(45) Date of Patent: Jan. 24, 2012

(54) POWER SOURCE DEVICE AND OUTPUT VOLTAGE STABILIZING METHOD

(75) Inventor: Yasuhiro Iino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/569,940

(22) Filed: Sep. 30, 2009

(65) Prior Publication Data

US 2010/0085026 A1    Apr. 8, 2010

(30) Foreign Application Priority Data

Oct. 2, 2008  (JP) ................. 2008-257849

(51) Int. Cl.
*G05F 1/40* (2006.01)
*H02M 3/335* (2006.01)
(52) U.S. Cl. .................................. 323/290; 363/40
(58) Field of Classification Search .......... 323/265, 323/282, 283, 290, 351; 363/20, 21.01, 39, 363/40, 62
See application file for complete search history.

(56) References Cited

U.S. PATENT DOCUMENTS

| | | | |
|---|---|---|---|
| 3,953,783 A * | 4/1976 | Peters, Jr. ............... | 363/124 |
| 4,151,387 A * | 4/1979 | Peters, Jr. ............... | 219/626 |
| 5,798,630 A * | 8/1998 | Sugimori et al. ........ | 320/137 |
| 6,198,644 B1 * | 3/2001 | Minamisawa ........... | 363/44 |
| 6,400,579 B2 * | 6/2002 | Cuk ......................... | 363/16 |
| 2003/0048644 A1 | 3/2003 | Nagai et al. | |
| 2011/0080053 A1 * | 4/2011 | Urano ...................... | 307/104 |

FOREIGN PATENT DOCUMENTS

| | | |
|---|---|---|
| JP | 2003-88114 | 3/2003 |
| JP | 2004-274904 | 9/2004 |
| JP | 2005-168157 | 6/2005 |

* cited by examiner

*Primary Examiner* — Adolf Berhane
(74) *Attorney, Agent, or Firm* — Fujitsu Patent Center

(57) ABSTRACT

A power source device includes: a switching section switching an input voltage supplied to a load section; a smoothing inductor section smoothing and outputting an output current to be supplied to the load section in accordance with a switching of the switching section; a first inductor section decreasing an output inductance value of the smoothing inductor section; a second inductor section increasing the output inductance value of the smoothing inductor section; an electromagnetic induction activating section activating the electromagnetic induction between the smoothing inductor section and the first or the second inductor section; a load current fluctuation detecting section detecting a steep fluctuation in a load current; and a control section controlling the electromagnetic induction activating section so as to activate the electromagnetic induction between the smoothing inductor section and the first or the second inductor section when the steep fluctuation of the load current is detected.

8 Claims, 4 Drawing Sheets

POWER SOURCE DEVICE AND OUTPUT VOLTAGE STABILIZING METHOD

CROSS-REFERENCE TO RELATED APPLICATION

This application is based upon and claims the benefit of priority of the prior Japanese Patent Application No. 2008-257849, filed on Oct. 2, 2008, the entire contents of which are incorporated herein by reference.

BACKGROUND

1. Field

The present invention relates to a power source device that supplies a stabilized output voltage to a load section, for example, of a semiconductor device incorporated into server equipment or network equipment, and to an output voltage stabilizing method used therein.

2. Description of Related Art

Recently, the development of semiconductor devices such as LSIs (Large Scale Integrations), CPUs (Central Processing Units), and FPGAs (Field Programmable Gate Arrays) has made rapid progress and a reduction in operating voltage and increases in current handled and operating speed of the semiconductor devices as mentioned above have been rapidly promoted accordingly.

Therefore, as for a power source device that supplies power to the load section of the semiconductor device as mentioned above, requirements for a performance of supplying a stabilized output voltage to the load section of the semiconductor device have become extremely strict.

In order to meet the above mentioned requirements, high-speed response characteristics to a fluctuation in load of the load section have been strongly desired in the power source device, so that making higher a switching frequency has been promoted as a countermeasure thereto. However, in reality, making the switching frequency higher is now reaching its limit from the viewpoints of power conversion efficiency attained and heat generated.

There are known techniques in which if a reduction in output voltage due to the occurrence of a large amplitude and high speed fluctuation in load of the load section of the power source device has been detected, an output inductance is made variable to stabilize the output voltage which has been fluctuated due to the occurrence of the fluctuation in load of the load section (see, for example, Japanese Laid-Open Patent Publication Nos. 2005-168157, 2004-274904 and 2003-88114).

SUMMARY

According to an embodiment of the present invention, a power source device includes: a switching section switching an input voltage supplied to a load section; a smoothing inductor section smoothing and outputting an output current to be supplied to the load section in accordance with a switching of the switching section; a first inductor section decreasing an output inductance value of the smoothing inductor section; a second inductor section increasing the output inductance value of the smoothing inductor section; an electromagnetic induction activating section activating the electromagnetic induction between the smoothing inductor section and the first or the second inductor section; a load current fluctuation detecting section detecting a steep fluctuation in a load current; and a control section controlling the electromagnetic induction activating section so as to activate the electromagnetic induction between the smoothing inductor section and the first or the second inductor section when the steep fluctuation of the load current is detected.

It is to be understood that both the foregoing summary description and the following detailed description are explanatory as to some embodiments of the present invention, and are not restrictive of the present invention as claimed.

DETAILED DESCRIPTION OF SAMPLE EMBODIMENTS

Next, embodiments relating to a power source device and an output voltage stabilizing method of the present invention will be described in detail with reference to the accompanying drawings.

First, the embodiments of the present invention will be briefly described. That is, the embodiments related to a power source device using a converter such as a DC/DC converter that smoothes and outputs an output current to be supplied to a load section in accordance with a switching operation performed to switch an input voltage to be supplied from a power source section to a load section. The power source device according to the embodiments of the present invention is configured such that even if an output voltage to be supplied to the load section has been lowered due to the occurrence of a steeply increasing fluctuation in a load current, a stabilized output voltage is supplied to the load section by activating electromagnetic induction between a smoothing inductor section and a first inductor section to decrease an output inductance value of the smoothing inductor section, coping with voltage lowering due to the occurrence of the steeply increasing fluctuation in the load current.

The power source device according to the embodiments of the present invention is also configured such that even if the output voltage to be supplied to the load section has been raised due to the occurrence of a steeply decreasing fluctuation in load current, the stabilized output voltage is supplied to the load section by activating electromagnetic induction between the smoothing inductor section and a second inductor section to increase the output inductance value of the smoothing inductor section, coping with voltage raising due to the occurrence of the steeply decreasing fluctuation in the load current.

Embodiment 1

Figure 1:
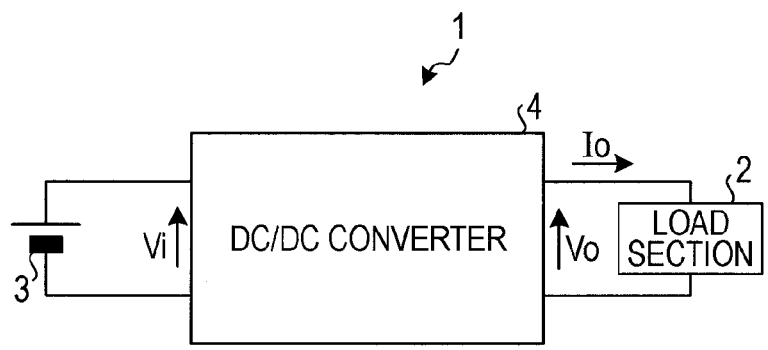
FIG. 1 is a block diagram illustrating a schematic internal configuration of a power source device according to an embodiment 1 of the present invention.

FIG. 1 is a diagram illustrating a schematic internal configuration of a power source device according to an embodiment 1 of the present invention.

The power source device 1 illustrated in FIG. 1 includes a power source section 3 that supplies power to a load section 2 and a DC/DC converter 4 that stably supplies a specific output voltage from the power source section 3 to the load section 2.

The load section 2 corresponds to a load of a semiconductor device, for example, such as an LSI, a CPU or an FPGA involving a low voltage, large current, and dynamic high-speed fluctuation.

The DC/DC converter 4 corresponds to a non-insulated type step-down DC/DC converter 4A that step-down-converts an input voltage Vi supplied from the power source section 3 to an output voltage Vo suited for the load section 2.

Figure 2:
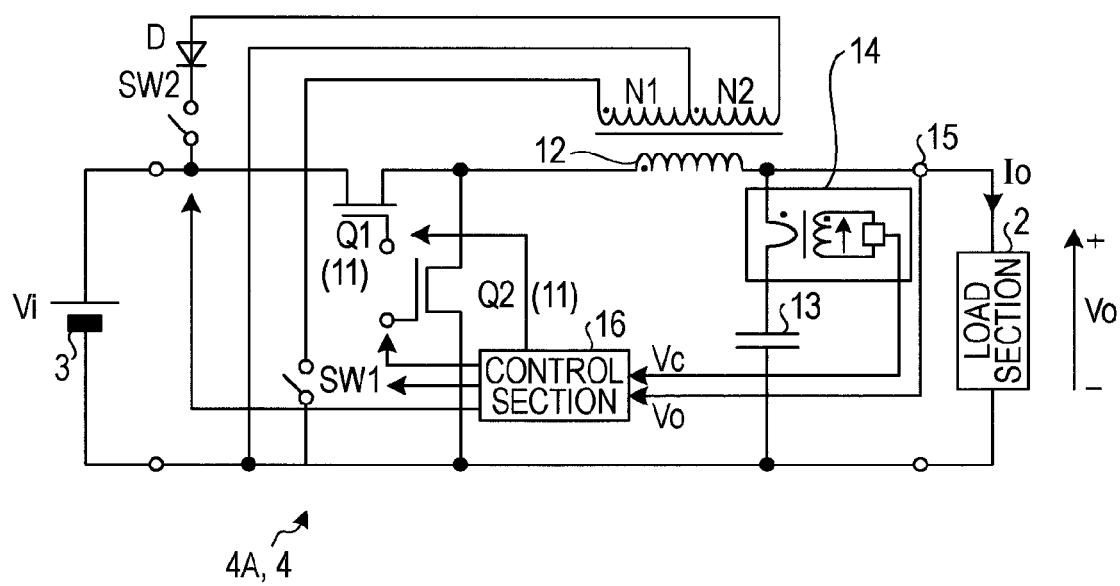
FIG. 2 is a diagram illustrating a circuit configuration in a non-insulated type step-down DC/DC converter.

FIG. 2 is a diagram illustrating a circuit configuration within the non-insulated type step-down DC/DC converter 4A.

The non-insulated type step-down DC/DC converter 4A illustrated in FIG. 2 has a switching section 11 that switches the input voltage Vi to be supplied from the power source section 3 to the load section 2, and a smoothing inductor section 12 and a smoothing capacitor section 13 that smooth and output an output current Io to be supplied to the load section 2 in accordance with a switching operation performed using the switching section 11 so as to stably output a specific output voltage to the load section 2.

The switching section 11 has a first switching element Q1 that is turned ON or OFF to establish or interrupt connection between the power source section 3 and the smoothing inductor section 12, and a second switching element Q2 that is turned ON so as to form a closed circuit between the smoothing inductor section 12 and the load section 2 when the first switching element Q1 is turned OFF, and is turned OFF so as to open the closed circuit between the smoothing inductor section 12 and the load section 2 when the first switching element Q1 is turned ON. The first switching element Q1 and the second switching element Q2 may be configured by, for example, MOS-FTEs.

The non-insulated type step-down DC/DC converter 4A has a first inductor section N1 that decreases an output inductance value L of the smoothing inductor section 12 in accordance with electromagnetic induction activated between the smoothing inductor section 12 and the first inductor section N1, and a second inductor section N2 that increases the output inductance value L of the smoothing inductor section 12 in accordance with electromagnetic induction activated between the smoothing inductor section 12 and the second inductor section N2. The output inductance value L of the smoothing inductor section 12 may be set as variable in accordance with the number of turns of a coil of each of the first inductor section N1 and the second inductor section N2.

The non-insulated type step-down DC/DC converter 4A also has a first switch section SW1 that is turned ON or OFF to establish or interrupt connection across the first inductor section N1, and a second switch section SW2 that is turned ON or OFF to establish or interrupt connection across the second inductor N1 and across the power source section 3.

The non-insulated type step-down DC/DC converter 4A further has a load current fluctuation detecting section 14 that detects a steeply increasing fluctuation +ΔIo or a steeply decreasing fluctuation −ΔIo in the load current on the side of the load section 2, an output voltage detecting section 15 that detects an output voltage to be supplied to the load section 2, and a control section 16 that controls the operations of the non-insulated type step-down DC/DC converter 4A.

The load current fluctuation detecting section 14 is series-connected with the smoothing capacitor section 13 to detect the steeply increasing fluctuation +ΔIo and the steeply decreasing fluctuation −ΔIo in the load current on the side of the load section 2 based on a difference between a current flowing into the smoothing capacitor section 13 and a current flowing out of the smoothing capacitor section 13.

The control section 16 controls the turning ON or OFF of the first switching element Q1, the second switching element Q2, the first switch section SW1, and the second switch section SW2.

The control section 16 operates to supply the output current Io to the load section 2 in accordance with an ON operation of the first switching element Q1 and an OFF operation of the second switching element Q2, while the output current Io is being stored in the smoothing inductor section 12 and the smoothing capacitor section 13 in accordance with the input voltage Vi supplied from the power source section 3.

The control section 16 also operates to form a closed circuit among the smoothing inductor section 12, the smoothing capacitor section 13, the load section 2, and the second switching element Q2 in a state in which the connection between the first switching element Q1 and the smoothing inductor section 12 is interrupted in accordance with an OFF operation of the first switching element Q1 and an ON operation of the second switching element Q2, thereby supplying the output current Io, which is being stored in the smoothing inductor section 12 and the smoothing capacitor section 13, to the load section 2 via the closed circuit so formed.

That is, the control section 16 operates to stably output the corresponding output voltage Vo from the power source section 3 to the load section 2 in accordance with the ON/OFF operations of the first switching element Q1 and the second switching element Q2.

Figure 3:
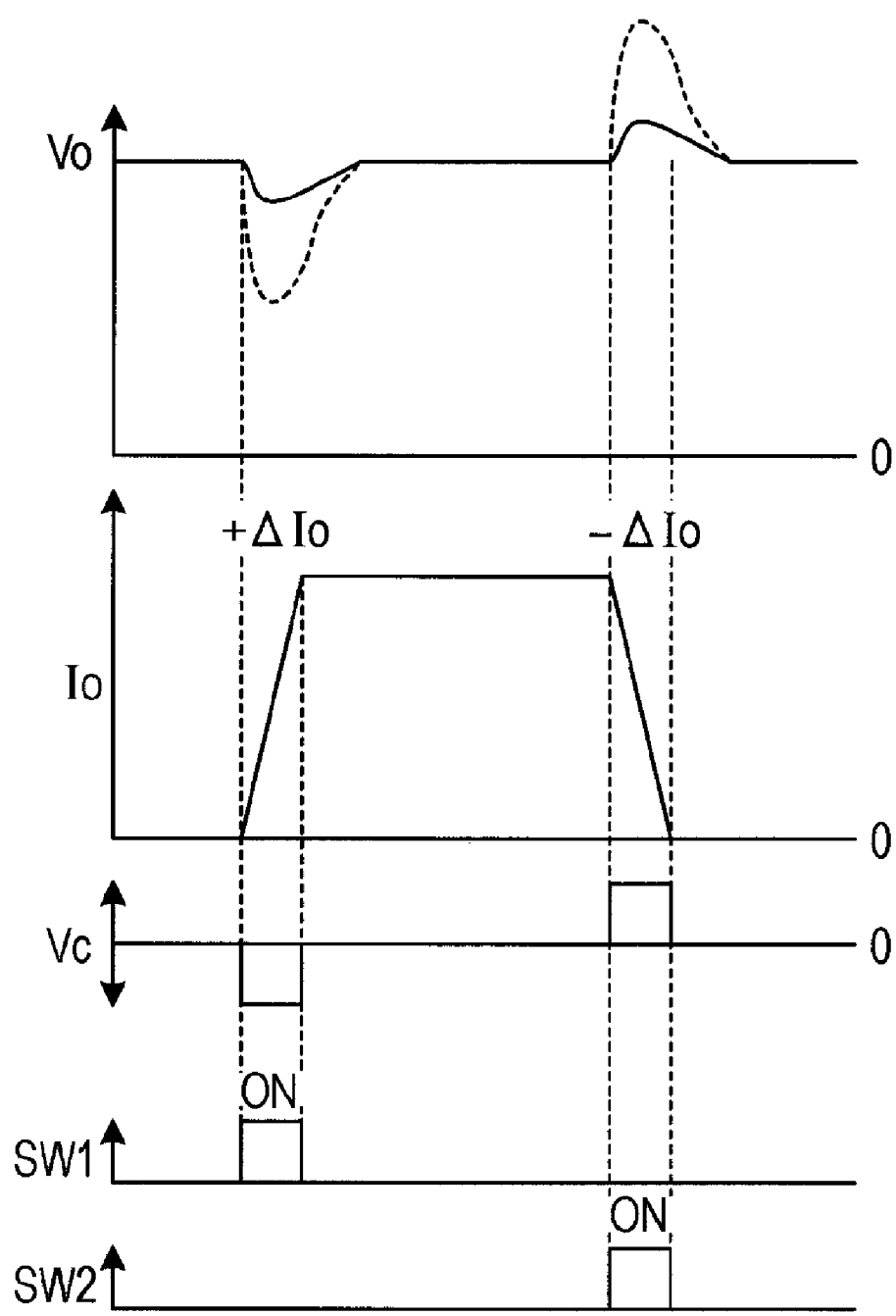
FIG. 3 is a timing chart illustrating relations among an output voltage, an output current, a steep current fluctuation detection voltage, a first switching element, and a second switching element of a power source device according to the embodiment of the present invention.

FIG. 3 is a timing chart illustrating relations among the output voltage Vo, the output current Io, a steep current fluctuation detection voltage Vc, the first switch section SW1, and the second switch section SW2 of the power source device 1.

As illustrated in FIG. 3, the steeply increasing fluctuation in load current corresponds to a steeply increasing fluctuation in the load current which occurs on the side of the load section 2 when the power source is turned ON, and the steeply decreasing fluctuation in load current corresponds to a steeply decreasing fluctuation in load current which occurs on the side of the load section 2 when the power source is turned OFF. Gradients of the steeply increasing fluctuation and the steeply decreasing fluctuation respectively indicate that the load current fluctuates at a rate of, for example, tens A to hundreds A/μ.

If the load current fluctuation detecting section 14 has detected the steeply increasing fluctuation +ΔIo in the load current, the control section 16 operates to maintain conduction between the power source section 3 and the load section 2 via the first switching element Q1 by holding the first switching element Q1 ON and holding the second switching element Q2 OFF, thereby controlling lowering of the output voltage Vo to be supplied to the load section 2. The control section 16 judges that the load current fluctuation detecting section 14 has detected the steeply increasing fluctuation +ΔIo in the load current in accordance with a minus detection voltage Vc supplied from the load current fluctuation detecting section 14.

When the steeply increasing fluctuation +ΔIo has been detected, the control section 16 operates to turn the first switch section W1 ON and turn the second switch section SW2 OFF to short-circuit and connect across the first inductor section N1 in accordance with the ON operation of the first switch section SW1, thereby activating electromagnetic induction between the first inductor section N1 and the smoothing inductor section 12.

When the electromagnetic induction is activated between the smoothing inductor section 12 and the first inductor section N1, the output inductance value L of the smoothing inductor section 12 is decreased by the amount corresponding to the number of turns of the coil of the first inductor section N1. As a result, the amount of current flowing from the power source section 3 to the load section 2 is increased and hence the output voltage Vo is raised more sharply than an output voltage Vo (shown by the dotted line) attained by an existing device upon the occurrence of the steeply increasing fluctuation +ΔIo in the load current illustrated in FIG. 3.

When the load current fluctuation detecting section 14 has detected the steeply decreasing fluctuation −ΔIo in load current, the control section 16 operates to keep supplying the current which is being stored in the smoothing inductor section 12 and the smoothing capacitor section 13 to the load section 2, while interrupting conduction (current-carrying) from the power source section 3 to the load section 2 by holding the first switching section Q1 OFF and holding the second switching element Q2 ON, thereby controlling raising of the output voltage Vo to be supplied to the load section 2. The control section 16 judges that the load current fluctuation detecting section 14 has detected the steeply decreasing fluctuation −ΔIo in load current in accordance with a plus detection voltage Vc supplied from the load current fluctuation detecting section 14.

When the steeply decreasing fluctuation −ΔIo in the load current has been detected, the control section 16 operates to turn the first switch section W1 OFF and turn the second switch section SW2 ON to connect across the second inductor section N2 and across the power source section 3 in accordance with the ON operation of the second switch section SW2, thereby activating electromagnetic induction between the second inductor section N2 and the smoothing inductor section 12.

When the electromagnetic induction is activated between the smoothing inductor section 12 and the second inductor section N2, the output inductance value L of the smoothing inductor section 12 is increased to return the current which is being stored in the smoothing inductor section 12 to the power source section 3 via the second inductor section N2 and a diode D. As a result, the amount of current flowing from the power source section 3 to the load section 2 is decreased and hence the output voltage Vo is lowered more sharply than the output voltage Vo (shown by the dotted line) attained by the existing device upon the occurrence of the steeply decreasing fluctuation −ΔIo in load current illustrated in FIG. 3.

Figure 4:
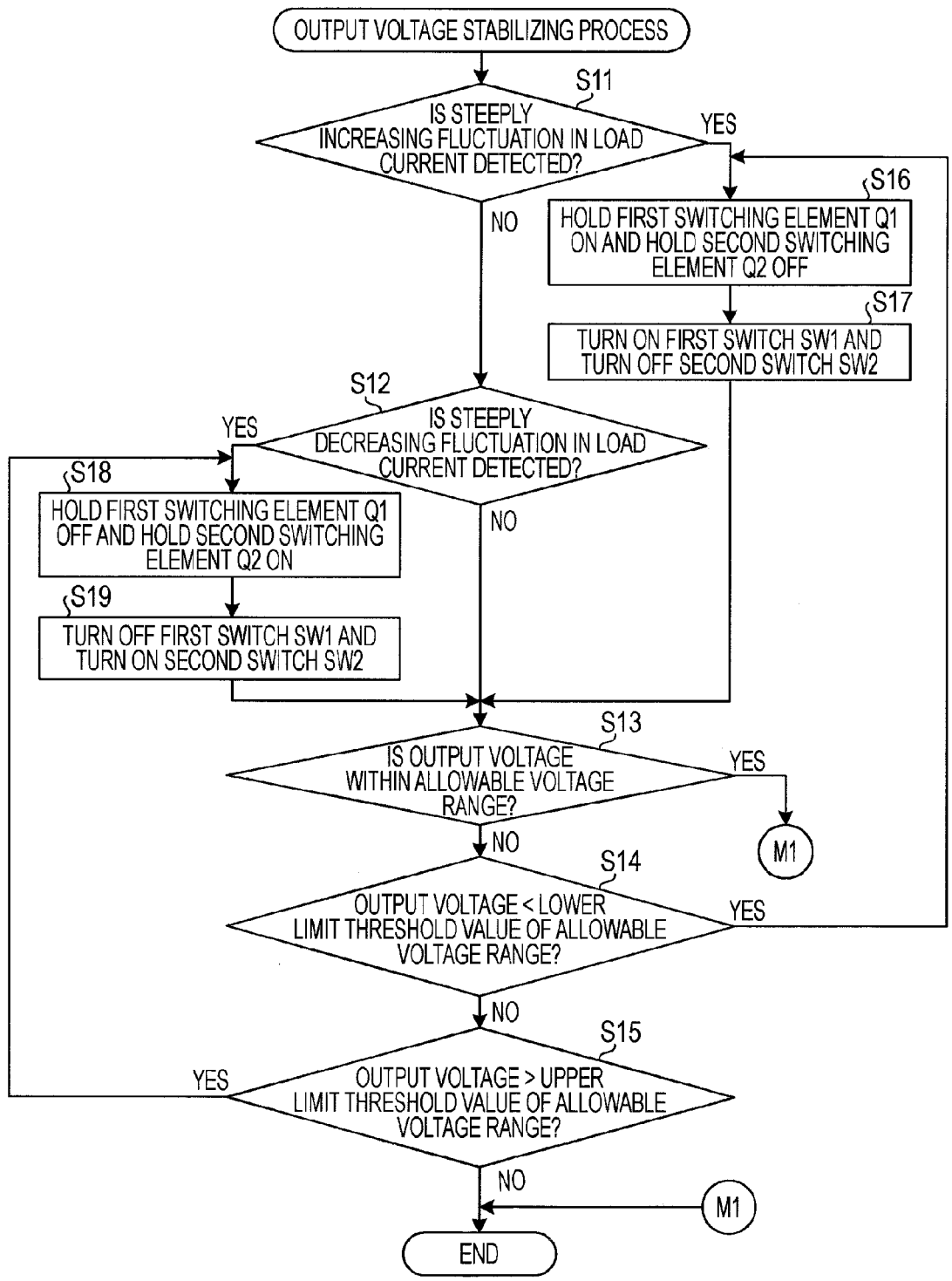
FIG. 4 is a flowchart illustrating processing operations performed within a control section involving an output voltage stabilizing process.

Next, the operations of the power source device 1 according to the embodiment 1 of the present invention will be described. FIG. 4 is a flow chart illustrating processing operations performed within the control section 16 involving an output voltage stabilizing process.

The output voltage stabilizing process illustrated in FIG. 4 is a process to be performed to control a fluctuation in the output voltage Vo due to the occurrence of a steep fluctuation in the load current on the side of the load section 2 to stabilize the output voltage Vo within an allowable voltage range even when the steep fluctuation in the load current has occurred on the side of the load section 2.

In the flow chart in FIG. 4, the control section 16 operates to judge whether the steeply increasing fluctuation +ΔIo in load current has been detected or not using the load current fluctuation detecting section 14 (step S11).

If the steeply increasing fluctuation +ΔIo in the load current is not detected using the load current fluctuation detecting section 14 (NO at step S11), the control section 16 operates to judge whether the steeply decreasing fluctuation −ΔIo in the load current has been detected using the load current fluctuation detecting section 14 (step S12).

If the steeply decreasing fluctuation −ΔIo in the load current has not been detected using the load current fluctuation detecting section 14 (NO at step S12), the control section 16 operates to judge whether the output voltage Vo to be supplied to the load section 2 is within the allowable voltage range using the output voltage detecting section 15 (step S13). The allowable voltage range corresponds to a voltage range which may be allowed as a range of the output voltage Vo to be supplied to the load section 2.

If the output voltage Vo is not within the allowable voltage range (NO at step S13), the control section 16 operates to judge whether the output voltage Vo is less than a lower limit voltage threshold value in the allowable voltage range (step S14). The lower limit voltage threshold value corresponds to a minimum voltage value which may be allowed as a value in the allowable voltage range of the output voltage Vo to be supplied to the load section.

If the output voltage Vo is not less than the lower limit voltage threshold value in the allowable voltage range (NO step S14), the control section 16 operates to judge whether the output voltage Vo is more than an upper limit voltage threshold value in the allowable voltage range (step S15). The upper limit voltage threshold value corresponds to a maximum voltage value which may be allowed as a value in the allowable voltage range of the output voltage Vo to be supplied to the load section 2.

If the output voltage Vo is not more than the upper limit voltage threshold value in the allowable voltage range (NO at step S15), the control section 16 operates to terminate the processing operations in FIG. 4.

If the steeply increasing fluctuation +ΔIo in load current is detected at step S11 (YES at step S11), the control section 16 operates to hold the first switching element Q1 ON and hold the second switching element Q2 OFF (step S16), thereby maintaining conduction (current-carrying) from the power source section 3 to the load section 2.

After the first switching element Q1 has been turned ON and the second switching element Q2 has been turned OFF, the control section 16 operates to turn the first switch SW1 ON and turn the second switch SW2 OFF (step S17), and then to proceed to step S13 so as to judge whether the output voltage Vo is within the allowable voltage range.

The first switch section SW1 is turned ON to short-circuit and connect across the first inductor section N1 so as to activate electromagnetic induction between the first inductor section N1 and the smoothing inductor section 12. The output inductance value L of the smoothing inductor section 12 is decreased by the amount corresponding to the number of turns of the coil of the first inductor section N1 in accordance with the electromagnetic induction activated between the smoothing inductor section 12 and the first inductor section N1, by which the amount of current flowing from the power source section 3 into the load section 2 may be increased. As a result, in the power source device 1, voltage lowering due to the occurrence of the steeply increasing fluctuation +ΔIo in the load current may be minimized and hence the output voltage Vo which is stabilized within the allowable voltage range may be supplied to the load section 2.

If the steeply decreasing fluctuation −ΔIo in the load current has been detected at step S12 (YES at step S12), the control section 16 operates to hold the first switching element Q1 OFF and hold the second switching element Q2 ON (step S18), to interrupt conduction (current-carrying) from the power source section 3 to the load section 2. and to keep supplying the current which is being stored in the smoothing inductor section 12 and the smoothing capacitor section 13 to the load section 2, thereby controlling raising of the output voltage Vo to be supplied to the load section 2.

After the first switching element Q1 has been turned OFF and the second switching element Q2 has been turned ON, the control section 16 operates to turn the second switch section SW2 ON and turn the first switch section SW1 OFF (step S19) and then to proceed to step S13 in order to judge whether the output voltage Vo is within the allowable voltage range.

The second switch SW2 is turned ON to connect across the second inductor section N2 and across the power source section 3 to activate electromagnetic induction between the second inductor section N2 and the smoothing inductor section 12. The output inductance value L of the smoothing inductor section 12 is increased in accordance with the electromagnetic induction activated between the second inductor section N2 and the smoothing inductor section 12, and the current which is being stored in the smoothing inductor section 12 is returned to the power source section 3 via the second inductor section N2 and the diode D, by which the amount of current flowing from the power source section 3 into the load section 2 is decreased. As a result, in the power source device 1, voltage rising due to the occurrence of the steeply decreasing fluctuation −ΔIo in load current is minimized and hence the output voltage Vo which is stabilized within the allowable voltage range is supplied to the load section 2.

If the output voltage Vo is within the allowable voltage range at step S13 (YES at step S13), the control section 16 proceeds to M1 in the illustration in order to terminate the processing operations illustrated in FIG. 4.

If the output voltage Vo is less than the lower limit voltage threshold value in the allowable voltage range at step S14 (YES at step S14), the control section 16 proceeds to step S16 in order to hold the first switching element Q1 ON and hold the switching element Q2 OFF.

If the output voltage Vo is more than the upper limit voltage threshold value in the allowable voltage range at step S15 (YES at step S15), the control section 16 proceeds to step S18 in order to hold the first switching element Q1 OFF and hold the second switching element Q2 ON.

According to the embodiment 1 of the present invention, even if the output voltage Vo to be supplied to the load section 2 has been lowered due to the occurrence of the steeply increasing fluctuation +ΔIo in load current on the side of the load section 2, the electromagnetic induction is activated between the smoothing inductor section 12 and the first inductor section N1 to decrease the output inductance value L of the smoothing inductor section 12 to increase the output current Io to be supplied to the load section 2, thereby raising the output voltage Vo to be supplied to the load section 2. As a result, even if the voltage is lowered due to the occurrence of the steeply increasing fluctuation +ΔIo in load current, it may become possible to supply the output voltage Vo which is stabilized within the allowable voltage range.

According to the embodiment 1 of the present invention, even if the output voltage Vo to be supplied to the load section 2 has been lowered due to the occurrence of the steeply increasing fluctuation +ΔIo in load current on the side of the load section 2, conduction (current-carrying) from the power source section 3 to the load section 2 is maintained by holding the first switching element Q1 ON and holding the second switching element Q2 OFF while decreasing the output inductance value L of the smoothing inductor section 12 so as to increase the output current Io to be supplied to the load section 2, thereby raising the output voltage Vo to be supplied to the load section 2. As a result, even if the voltage is lowered due to the occurrence of the steeply increasing fluctuation +ΔIo in load current, it may become possible to supply the output voltage Vo which is stabilized within the allowable voltage range.

According to the embodiment 1 of the present invention, even if the output voltage Vo to be supplied to the load section 2 has been raised due to the occurrence of the steeply decreasing fluctuation −ΔIo in load current on the side of the load section 2, electromagnetic induction is activated between the smoothing inductor section 12 and the second inductor section N2 to increase the output inductance value L of the smoothing inductor section 12 to decrease the output current Io to be supplied to the load section 2, thereby lowering the output voltage Vo to be supplied to the load section 2. As a result, even if the voltage is raised due to the occurrence of the steeply decreasing fluctuation −ΔIo in load current, it may become possible to supply the output voltage Vo which is stabilized within the allowable voltage range.

According to the embodiment 1 of the present invention, even if the output voltage Vo to be supplied to the load section 2 has been raised due to the occurrence of the steeply decreasing fluctuation −ΔIo in load current on the side of the load section 2, conduction (current-carrying) from the power source section 3 to the load section 2 is interrupted by holding the first switching element Q1 OFF and holding the second switching element Q2 ON while increasing the output inductance value L of the smoothing inductor section 12 so as to decrease the output current Io to be supplied to the load section 2, thereby lowering the output voltage Vo to be supplied to the load section 2. As a result, even if the voltage is raised due to the occurrence of the steeply decreasing fluctuation −ΔIo in load current, it may become possible to supply the output voltage Vo which is stabilized within the allowable voltage range.

According to the embodiment 1 of the present invention, if the output voltage Vo which has been detected using the output voltage detecting section 15 is less than the lower limit voltage threshold value, electromagnetic induction is activated between the smoothing inductor section 12 and the first inductor section N1 to decrease the output inductance value L of the smoothing inductor section 12 to increase the output current Io to be supplied to the load section 2, thereby raising the output voltage Vo to be supplied to the load section 2. As a result, even if the output voltage is lowered, it may become possible to supply the output voltage Vo which is stabilized within the allowable voltage range.

According to the embodiment 1 of the present invention, if the output voltage Vo which has been detected using the output voltage detecting section 15 is less than the lower limit voltage threshold value, conduction (current-carrying) from the power source section 3 to the load section 2 is maintained by holding the first switching element Q1 ON and holding the second switching element Q2 OFF while decreasing the output inductance value L of the smoothing inductor section 12 so as to increase the output current Io to be supplied to the load section 2, thereby raising the output voltage Vo to be supplied to the load section 2. As a result, even if the output voltage is lowered, it may become possible to supply the output voltage Vo which is stabilized within the allowable voltage range.

According to the embodiment 1 of the present invention, if the output voltage Vo which has been detected using the output voltage detecting section 15 is more than the upper limit voltage threshold value, electromagnetic induction is activated between the smoothing inductor section 12 and the second inductor section N2 to increase the output inductance value L of the smoothing inductor section 12 to decrease the output current Io to be supplied to the load section 2, thereby lowering the output voltage Vo to be supplied to the load section 2. As a result, even if the output voltage is raised, it may become possible to supply the output voltage Vo which is stabilized within the allowable voltage range.

According to the embodiment 1 of the present invention, if the output voltage Vo which has been detected using the output voltage detecting section 15 is more than the upper limit voltage threshold value, conduction (current-carrying) from the power source section 3 to the load section 2 is interrupted by holding the first switching element Q1 OFF and holding the second switching element Q2 ON while increasing the output inductance value L of the smoothing inductor section 12 so as to decrease the output current Io to be supplied to the load section 2, thereby lowering the output voltage Vo to be supplied to the load section 2. As a result, even if the output voltage is raised, it may become possible to supply the output voltage Vo which is stabilized within the allowable voltage range.

A general non-insulated type step-down DC/DC converter is designed to be connected to a low-voltage, large-current and dynamic high-speed fluctuation type load section 2. However, in order to compensate for high speed response characteristics to a fluctuation in load of the load section 2, it is necessary to dispose a large number of capacitors (pass capacitors) that absorb a change in output from the non-insulated type step-down DC/DC converter, that is, a change in voltage due to the occurrence of the fluctuation in load of the load section 2, such as, for example, pass capacitors of capacitances of as large as a thousand µF to several thousand µF. On the other hand, in the embodiment 1 of the present invention, the high speed response characteristics to the fluctuation in load of the load section 2 are ensured and hence the capacitances of pass capacitors used may be greatly decreased by controlling the change in voltage due to the occurrence of a steep fluctuation in load on the side of the load section 2.

In the embodiment 1, the non-insulated type step-down DC/DC converter 4A has been described by way of example. However, an insulated type step-down DC/DC converter may be used, instead. Next, an embodiment of a power source device into which an insulated-type step-down DC/DC converter is incorporated will be described as an embodiment 2.

Embodiment 2

Figure 5:
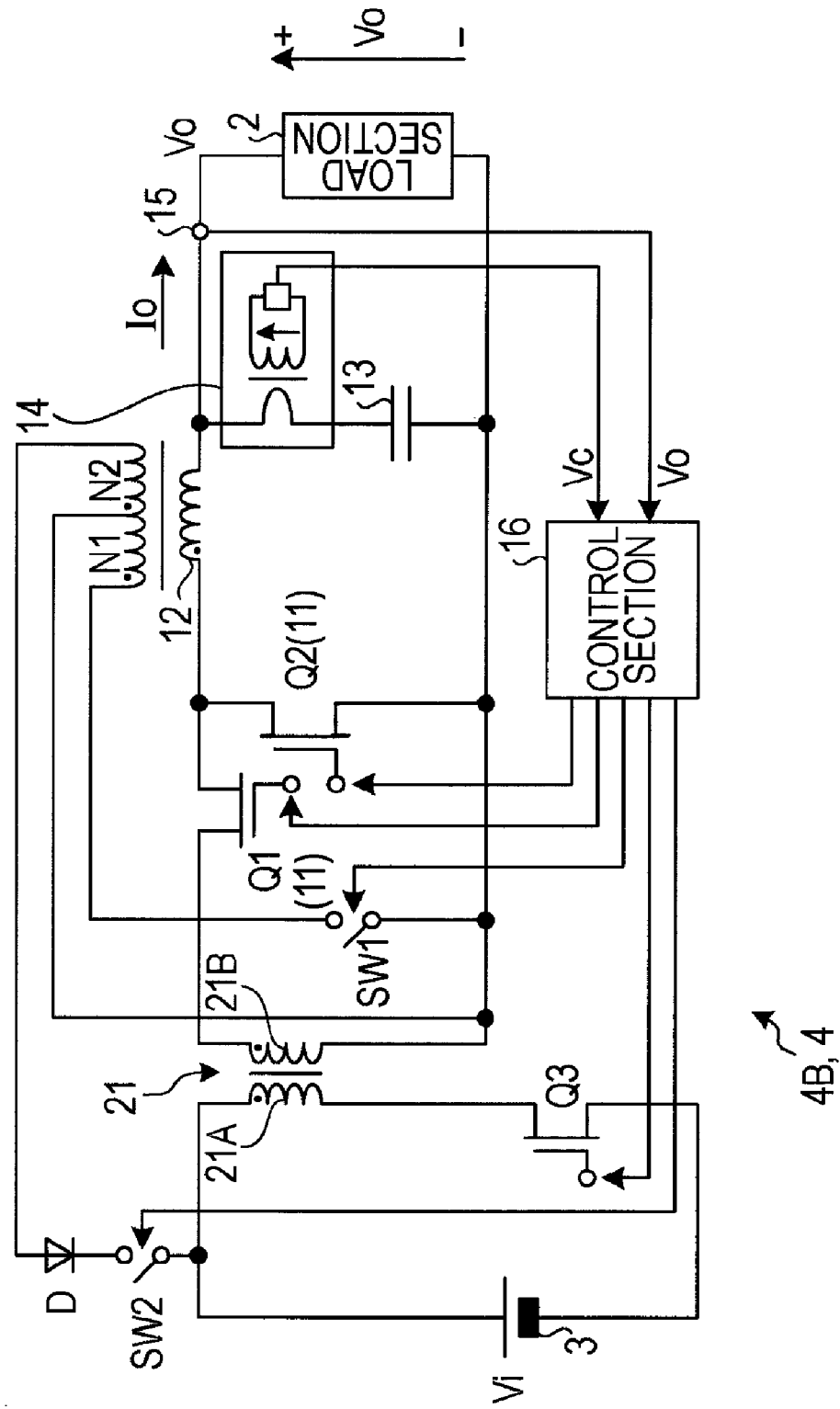
FIG. 5 is a diagram illustrating a circuit configuration in an insulated-type step-down DC/DC converter of a power source device according to an embodiment 2 of the present invention

FIG. 5 is a diagram illustrating a circuit configuration within an insulated-type step-down DC/DC converter which is incorporated into a power source device according to an embodiment 2 of the present invention. The same numerals are assigned to the same parts as those in the non-insulated type step-down DC/DC converter 4A according to the embodiment 1 of the present invention and description of these parts and operations thereof will be omitted.

An insulated-type step-down DC/DC converter 4B illustrated in FIG. 5 has a transformer 21 that insulates the power source section 3 from the first switching element Q1 and a third switching element Q3 that switches the input voltage Vi supplied from the power source section 3. The transformer 21 carries current from the power source section 3 to the first switching element Q1 on the side of a secondary coil 21B in accordance with a switching operation of the third switching element Q3 disposed on the side of a primary coil 21A.

The second inductor section N2 is connected to the power source section 3 on the side of the primary coil 21A at one end and is connected to the side of the secondary coil 21B at the other end. The second switch section SW2 is turned ON to connect across the second inductor section N2 and across the power source section 3 via the transformer 21 to activate electromagnetic induction between the second inductor section N2 and the smoothing inductor section 12.

When the steeply decreasing fluctuation −ΔIo in load current has been detected using the load current fluctuation detecting section 14, the control section 16 operates to turn the first switch section SW1 OFF and turn the second switch section SW2 ON to connect across the second inductor section N2 and across the power source section 3 in accordance with the ON operation of the second switch section SW2, thereby activating the electromagnetic induction between the second inductor section N2 and the smoothing inductor section 12.

When the electromagnetic induction is activated between the smoothing inductor section 12 and the second inductor section N2, the output inductance value L of the smoothing inductor section 12 is increased and the current which is being stored in the smoothing inductor section 12 returns to the power source section via the second inductor section N2 and the diode D. As a result, the amount of current flowing from the power source section 3 into the load section 2 is decreased.

According to the embodiment 2 of the present invention, even if the output voltage Vo to be supplied to the load section 2 has been lowered due to the occurrence of the steeply increasing fluctuation +ΔIo in load current on the side of the load section 2, the electromagnetic induction is activated between the smoothing inductor section 12 and the first inductor section N1 to decrease the output inductance value L of the smoothing inductor section 12 to increase the output current Io to be supplied to the load section 2, thereby raising the output voltage Vo to be supplied to the load section 2. As a result, even if the voltage is lowered due to the occurrence of the steeply increasing fluctuation +ΔIo in load current, it may become possible to supply the output voltage Vo which is stabilized within the allowable voltage range.

According to the embodiment 2 of the present invention, even if the output voltage Vo to be supplied to the load section 2 has been lowered due to the occurrence of the steeply increasing fluctuation +ΔIo in load current on the side of the load section 2, conduction (current-carrying) from the power source section 3 to the load section 2 is maintained by holding the first switching element Q1 ON and holding the second switching element Q2 OFF while decreasing the output inductance value L of the smoothing inductor section 12 so as to increase the output current Io to be supplied to the load section 2, thereby raising the output voltage Vo to be supplied to the load section 2. As a result, even if the voltage is lowered due to the occurrence of the steeply increasing fluctuation +ΔIo in load current, it may become possible to supply the output voltage Vo which is stabilized within the allowable voltage range.

According to the embodiment 2 of the present invention, even if the output voltage Vo to be supplied to the load section 2 has been raised due to the occurrence of the steeply decreasing fluctuation −ΔIo in load current on the side of the load section 2, electromagnetic induction is activated between the smoothing inductor section 12 and the second inductor section N2 to increase the output inductance value L of the smoothing inductor section 12 to decrease the output current Io to be supplied to the load section 2, thereby lowering the output voltage Vo to be supplied to the load section 2. As a result, even if the voltage is raised due to the occurrence of the steeply decreasing fluctuation −ΔIo in load current, it may become possible to supply the output voltage Vo which is stabilized within the allowable voltage range.

According to the embodiment 2 of the present invention, even if the output voltage Vo to be supplied to the load section 2 has been raised due to the occurrence of the steeply decreasing fluctuation −ΔIo in load current on the side of the load section 2, conduction (current-carrying) from the power source section 3 to the load section 2 is interrupted by holding the first switching element Q1 OFF and holding the second switching element Q2 ON while increasing the output inductance value L of the smoothing inductor section 12 so as to decrease the output current Io to be supplied to the load section 2, thereby lowering the output voltage Vo to be supplied to the load section 2. As a result, even if the voltage is raised due to the occurrence of the steeply decreasing fluctuation −ΔIo in load current, it may become possible to supply the output voltage Vo which is stabilized within the allowable voltage range.

According to the embodiment 2 of the present invention, if the output voltage Vo which has been detected using the output voltage detecting section 15 is less than the lower limit voltage threshold value, electromagnetic induction is activated between the smoothing inductor section 12 and the first inductor section N1 to decrease the output inductance value L of the smoothing inductor section 12 to increase the output current Io to be supplied to the load section 2, thereby raising the output voltage Vo to be supplied to the load section 2. As a result, even if the output voltage is lowered, it may become possible to supply the output voltage Vo which is stabilized within the allowable voltage range.

According to the embodiment 2 of the present invention, if the output voltage Vo which has been detected using the output voltage detecting section 15 is less than the lower limit voltage threshold value, conduction (current-carrying) from the power source section 3 to the load section 2 is maintained by holding the first switching element Q1 ON and holding the second switching element Q2 OFF while decreasing the output inductance value L of the smoothing inductor section 12 so as to increase the output current Io to be supplied to the load section 2, thereby raising the output voltage Vo to be supplied to the load section 2. As a result, even if the output voltage is lowered, it may become possible to supply the output voltage Vo which is stabilized within the allowable voltage range.

According to the embodiment 2 of the present invention, if the output voltage Vo which has been detected using the output voltage detecting section 15 is more than the upper limit voltage threshold value, electromagnetic induction is activated between the smoothing inductor section 12 and the second inductor section N2 to increase the output inductance value L of the smoothing inductor section 12 to decrease the output current Io to be supplied to the load section 2, thereby lowering the output voltage Vo to be supplied to the load section 2. As a result, even if the output voltage is raised, it may become possible to supply the output voltage Vo which is stabilized within the allowable voltage range.

According to the embodiment 2 of the present invention, if the output voltage Vo which has been detected using the output voltage detecting section 15 is more than the upper limit voltage threshold value, conduction (current-carrying) from the power source section 3 to the load section 2 is interrupted by holding the first switching element Q1 OFF and holding the second switching element Q2 ON while increasing the output inductance value L of the smoothing inductor section 12 so as to decrease the output current Io to be supplied to the load section 2, thereby lowering the output voltage Vo to be supplied to the load section 2. As a result, even if the output voltage is raised, it may become possible to supply the output voltage Vo which is stabilized within the allowable voltage range.

Although, in the above mentioned embodiments of the present invention, the non-insulated type step-down DC/DC converter 4A and the insulated type step-down DC/DC converter 4B have been described by way of example, the present invention may be also applied to, for example, a step-up DC/DC converter. In addition, the present invention is not limited to DC/DC converters and may be applied to converters of the type of stably outputting a specific output voltage regardless of the type of voltage, that is, AC voltage or DC voltage.

In addition, in the above mentioned embodiments of the present invention, the control section 16 which is configured to generally control the operations of the DC/DC converter 4 controls to turn the first switching element Q1, the second switching element Q2, the first switch section SW1, and the second switch section SW2 ON/OFF based on a result of detection performed using the load current fluctuation detecting section 14 and a result of detection performed using the output voltage detecting section 15. However, the control section 16 may be configured by, for example, a logical circuit.

Further, the above mentioned embodiments of the present invention are configured such that a steep fluctuation in load current is detected based on the result of detection performed using the load current fluctuation detecting section 14 and the result of detection performed using the output voltage detecting section 15, thereby controlling to turn the first switching element Q1, the second switching element Q2, the first switch section SW1, and the second switch SW2 section ON/OFF. However, a load current steep fluctuation predicting section that predicts a steep fluctuation in load current may be provided such that if the load current steep fluctuation predicting section has detected a steep fluctuation in load current, the control section 16 controls to turn the first switching element Q1, the second switching element Q2, the first switch section SW1 and the second section switch SW2 ON/OFF based on the detected steep fluctuation in load current.

Although the embodiments of the present invention have been described, the scope of technical concept of the present invention is not limited by the embodiments and various embodiments may be implemented without departing from the scope of technical concept of the present invention defined in the appended claims. In addition, advantageous effects of the present invention are not limited to those described in relation to the embodiments of the present invention.

In various processes which have been described in the embodiments of the present invention, all or some processes which have been described as automatically executed may be manually performed. All or some processes which have been described as manually performed may be automatically executed, contrary to the above. Processing procedures, control procedures, specific designations, and information including various data and parameters which have been described in the embodiments of the present invention may be appropriately altered unless otherwise specified.

Respective constitutional elements of respective devices illustrated in the drawings have been conceptually described in terms of functions and are not necessarily physically configured as illustrated in the drawings, and specific aspects of respective devices are not limited to those illustrated in the drawings.

All or arbitrarily selected processes and functions performed using the respective devices may be executed using a CPU (Central Processing Unit) (or a microcomputer such as a MPU (Micro Processing Unit or an MCU (Micro Controller Unit)), in programs which are analyzed and executed using the CPU (or the microcomputer such as the MPU or the MCU) or in hardware constructed by using wired logic.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A power source device comprising:
   a switching section switching an input voltage supplied from a power source section to a load section;
   a smoothing inductor section smoothing and outputting an output current to be supplied to the load section in accordance with a switching operation performed by the switching section so as to stably output a specific output voltage to be supplied to the load section;
   a first inductor section decreasing an output inductance value of the smoothing inductor section in accordance with electromagnetic induction between the first inductor section and the smoothing inductor section;
   a second inductor section increasing the output inductance value of the smoothing inductor section in accordance with electromagnetic induction between the second inductor section and the smoothing inductor section;
   an electromagnetic induction activating section activating the electromagnetic induction between the smoothing inductor section and the first inductor section or the electromagnetic induction between the smoothing inductor section and the second inductor section;
   a load current fluctuation detecting section detecting a steeply increasing fluctuation or a steeply decreasing fluctuation in a load current on a side of the load section; and
   a control section controlling operations of the electromagnetic induction activating section so as to activate the electromagnetic induction between the smoothing inductor section and the first inductor section when the load current fluctuation detecting section has detected the steeply increasing fluctuation in the load current, and controlling operations of the electromagnetic induction activating section so as to activate the electromagnetic induction between the smoothing inductor section and the second inductor section when the load current fluctuation detecting section has detected the steeply decreasing fluctuation in the load current.

2. The power source device according to claim 1, wherein the electromagnetic induction activating section has
   a first switch section turned ON or OFF to establish or interrupt connection across the first inductor section, wherein
   the electromagnetic induction activating section short-circuits and connects across the first inductor section in accordance with an ON operation of the first switch section to activate the electromagnetic induction between the smoothing inductor section and the first inductor section.

3. The power source device according to claim 1, wherein the electromagnetic induction activating section has
   a second switch section turned ON or OFF to establish or interrupt connection across the second inductor section and across the power source section, wherein
   the electromagnetic induction activating section connects across the second inductor section and across the power source section in accordance with an ON operation of the second switch section to activate the electromagnetic induction between the smoothing inductor section and the second inductor section.

4. The power source device according to claim 1, wherein the switching section has
   a first switching element turned ON or OFF to establish or interrupt connection between the power source section and the smoothing inductor section and
   a second switching element turned ON so as to form a closed circuit between the smoothing inductor section and the load section when the first switching element is turned OFF, and turned OFF so as to open the closed circuit between the smoothing inductor section and the load section when the first switching element is turned ON, and
   the control section
   operates to hold the first switching element ON and hold the second switching element OFF when the load current fluctuation detecting section has detected the steeply increasing fluctuation in the load current, and operates to hold the first switching element OFF and hold the second switching element ON when the load current fluctuation detecting section has detected the steeply decreasing fluctuation in the load current.

5. The power source device according to claim 1, wherein the load current fluctuation detecting section detects the steeply increasing fluctuation or the steeply decreasing fluctuation in the load current in accordance with the output voltage related to the load section.

6. The power source device according to claim 1, wherein a transformer is disposed between the power source section and the switching section, and the switching section switches an input voltage which has been input thereinto from the power source section via the transformer.

7. The power source device according to claim 1, wherein the load current fluctuation detecting section has a load current steep fluctuation predicting section predicting the steeply increasing fluctuation or the steeply decreasing fluctuation in the load current, and when the load current steep fluctuation predicting section predicts the steeply increasing fluctuation or the steeply decreasing fluctuation in the load current, detects the predicted steeply increasing fluctuation as the steely increasing fluctuation in the load current and detects the predicted steeply decreasing fluctuation as the steeply decreasing fluctuation in the load current.

8. A method of stabilizing an output voltage of a power source device including a switching section switching an input voltage to be supplied from a power source section to a load section, and a smoothing inductor section smoothing and outputting an output current to be supplied to the load section in accordance with a switching operation performed using the switching section so as to stably output a specific output voltage to be supplied to the load section, the method comprising:
   a load current fluctuation detecting step that detects a steeply increasing fluctuation or a steeply decreasing fluctuation in a load current of the load section;
   a first electromagnetic induction activating step that activates electromagnetic induction between the smoothing inductor section and a first inductor section, when the steeply increasing fluctuation in the load current is detected;

a voltage raising step that raises an output voltage to be supplied to the load section by decreasing an output inductance value of the smoothing inductor section to increase the output current to be supplied from the smoothing inductor section to the load section, when the electromagnetic induction is activated between the smoothing inductor section and the first inductor section at the first electromagnetic induction activating step;

a second electromagnetic induction activating step that activates the electromagnetic induction between the smoothing inductor section and a second inductor section, when the steeply decreasing fluctuation in the load current is detected; and the voltage lowering step that lowers the output voltage to be supplied to the load section by increasing the output inductance value of the smoothing inductor section to decrease the output current to be supplied from the smoothing inductor section to the load section, when the electromagnetic induction is activated between the smoothing inductor section and the second inductor section at the second electromagnetic induction activating step.

* * * * *